United States Patent
Deutsch et al.

(10) Patent No.: US 12,229,189 B2
(45) Date of Patent: *Feb. 18, 2025

(54) CONTINUOUS BUILDS OF DERIVED DATASETS IN RESPONSE TO OTHER DATASET UPDATES

(71) Applicant: Palantir Technologies Inc., Palo Alto, CA (US)

(72) Inventors: Daniel Deutsch, New York, NY (US); Kyle Solan, San Francisco, CA (US); Thomas Mathew, New York, NY (US); Vasil Vasilev, Cambridge, MA (US)

(73) Assignee: Palantir Technologies Inc., Denver, CO (US)

( * ) Notice: Subject to any disclaimer, the term of this patent is extended or adjusted under 35 U.S.C. 154(b) by 113 days.

This patent is subject to a terminal disclaimer.

(21) Appl. No.: 17/826,099

(22) Filed: May 26, 2022

(65) Prior Publication Data

US 2022/0284057 A1   Sep. 8, 2022

Related U.S. Application Data

(63) Continuation of application No. 15/963,038, filed on Apr. 25, 2018, now Pat. No. 11,379,525.

(60) Provisional application No. 62/589,856, filed on Nov. 22, 2017.

(51) Int. Cl.
G06F 16/901 (2019.01)
G06F 16/23 (2019.01)
G06F 16/27 (2019.01)

(52) U.S. Cl.
CPC ...... *G06F 16/9024* (2019.01); *G06F 16/2379* (2019.01); *G06F 16/27* (2019.01)

(58) Field of Classification Search
CPC ... G06F 16/9024; G06F 16/2379; G06F 16/27
See application file for complete search history.

(56) References Cited

U.S. PATENT DOCUMENTS

| | | |
|---|---|---|
| 6,208,990 B1 | 3/2001 | Suresh |
| 7,831,574 B2 | 11/2010 | Pareek |
| 8,447,721 B2 | 5/2013 | Eshleman |
| 8,719,769 B2 | 5/2014 | Castellanos |
| 8,725,707 B2 | 5/2014 | Chen |
| 9,589,069 B2 | 3/2017 | Yang |

(Continued)

*Primary Examiner* — Miranda Le
(74) *Attorney, Agent, or Firm* — Duane Morris LLP

(57) ABSTRACT

A data processing method comprises creating and storing a dependency graph representing at least one derived dataset and one or more raw datasets or intermediate derived datasets on which the at least one derived dataset depends; reading configuration data specifying one or more periods for one or more datasets in the dependency graph; detecting a first update to a first dataset; initiating a first build of a first intermediate derived dataset only when a then-current time is within a first period of the one or more periods or a previous build of the first intermediate derived dataset occurred earlier than a then-current time less a second period of the one or more periods; asynchronously detecting a second update to a second dataset; initiating, in response to the second update, a second build of a second intermediate derived dataset that depends on the second dataset.

18 Claims, 10 Drawing Sheets

(56) References Cited

U.S. PATENT DOCUMENTS

| | | | |
|---|---|---|---|
| 9,805,084 B2 | 10/2017 | Wright | |
| 9,887,878 B2* | 2/2018 | Mahajan | H04L 67/12 |
| 10,474,663 B2* | 11/2019 | Gray | G06F 16/23 |
| 10,599,719 B2* | 3/2020 | Sirin | G06F 18/217 |
| 2004/0186915 A1 | 9/2004 | Blaszcak | |
| 2007/0174188 A1* | 7/2007 | Fish | G06Q 20/10 |
| | | | 705/39 |
| 2009/0070785 A1* | 3/2009 | Alvez | H04L 67/61 |
| | | | 719/318 |
| 2009/0171999 A1 | 7/2009 | McColl | |
| 2011/0035354 A1* | 2/2011 | Wan | G06F 16/254 |
| | | | 707/602 |
| 2013/0227573 A1* | 8/2013 | Morsi | G06F 9/5083 |
| | | | 718/100 |
| 2013/0332812 A1 | 12/2013 | Houston | |
| 2014/0040182 A1 | 2/2014 | Gilder | |
| 2016/0103882 A1* | 4/2016 | Deshmukh | G06F 16/242 |
| | | | 707/770 |
| 2016/0224626 A1* | 8/2016 | Robichaud | G06F 16/24 |
| 2017/0039260 A1* | 2/2017 | Adya | G06F 16/27 |
| 2017/0195183 A1* | 7/2017 | Gershaft | H04L 41/22 |
| 2017/0255460 A1* | 9/2017 | Frank | G06F 9/45558 |
| 2017/0286526 A1* | 10/2017 | Bar-Or | G06F 8/34 |
| 2018/0075125 A1* | 3/2018 | Stiel | G06F 16/90335 |

\* cited by examiner

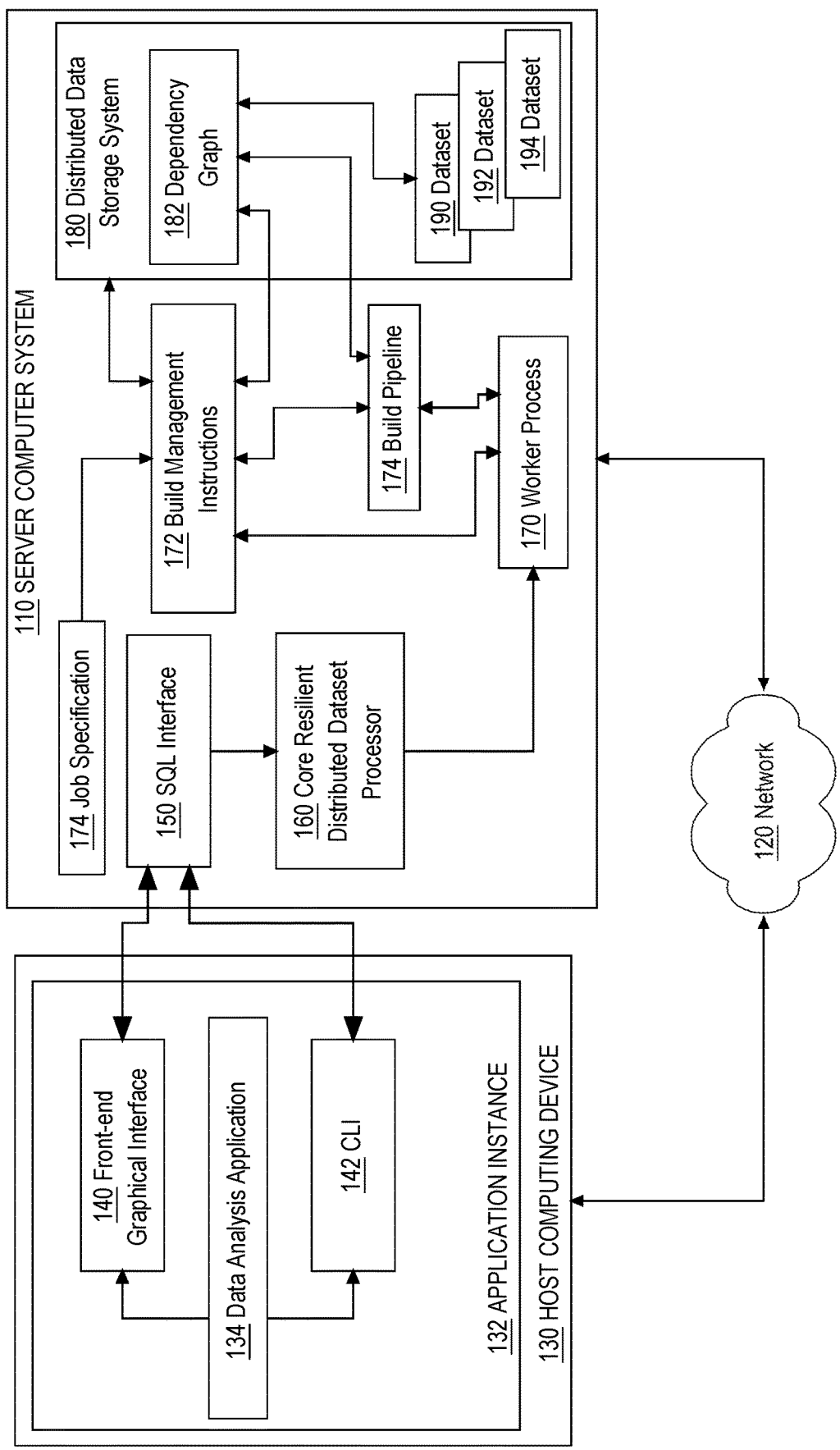

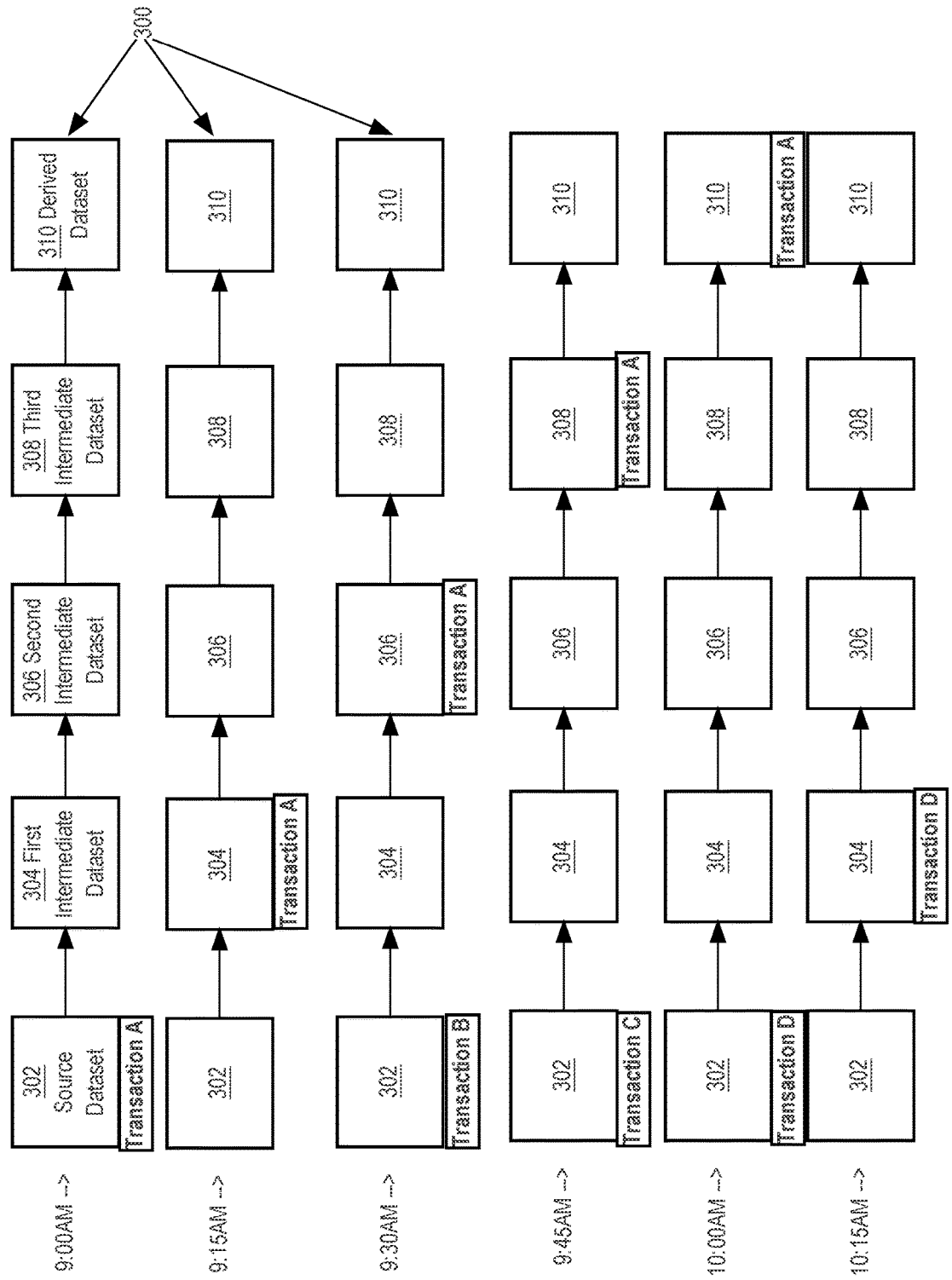

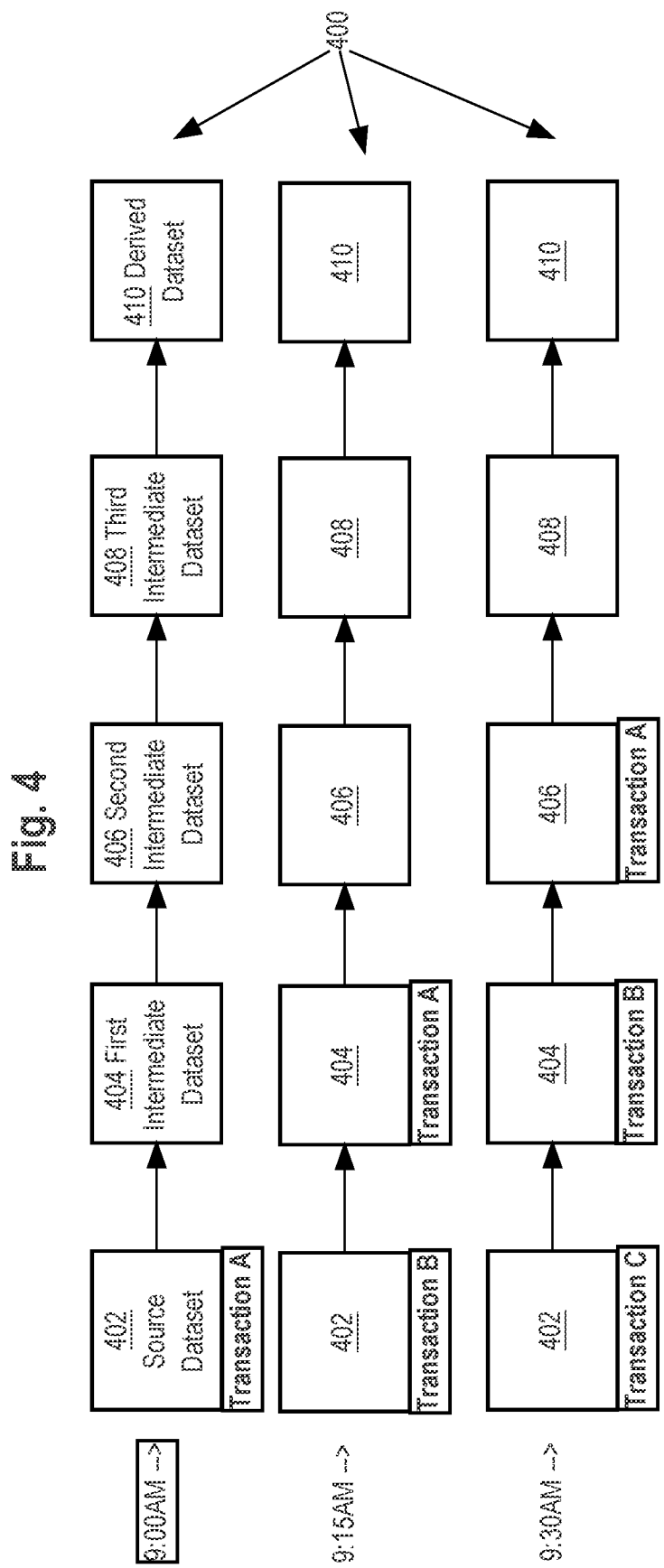

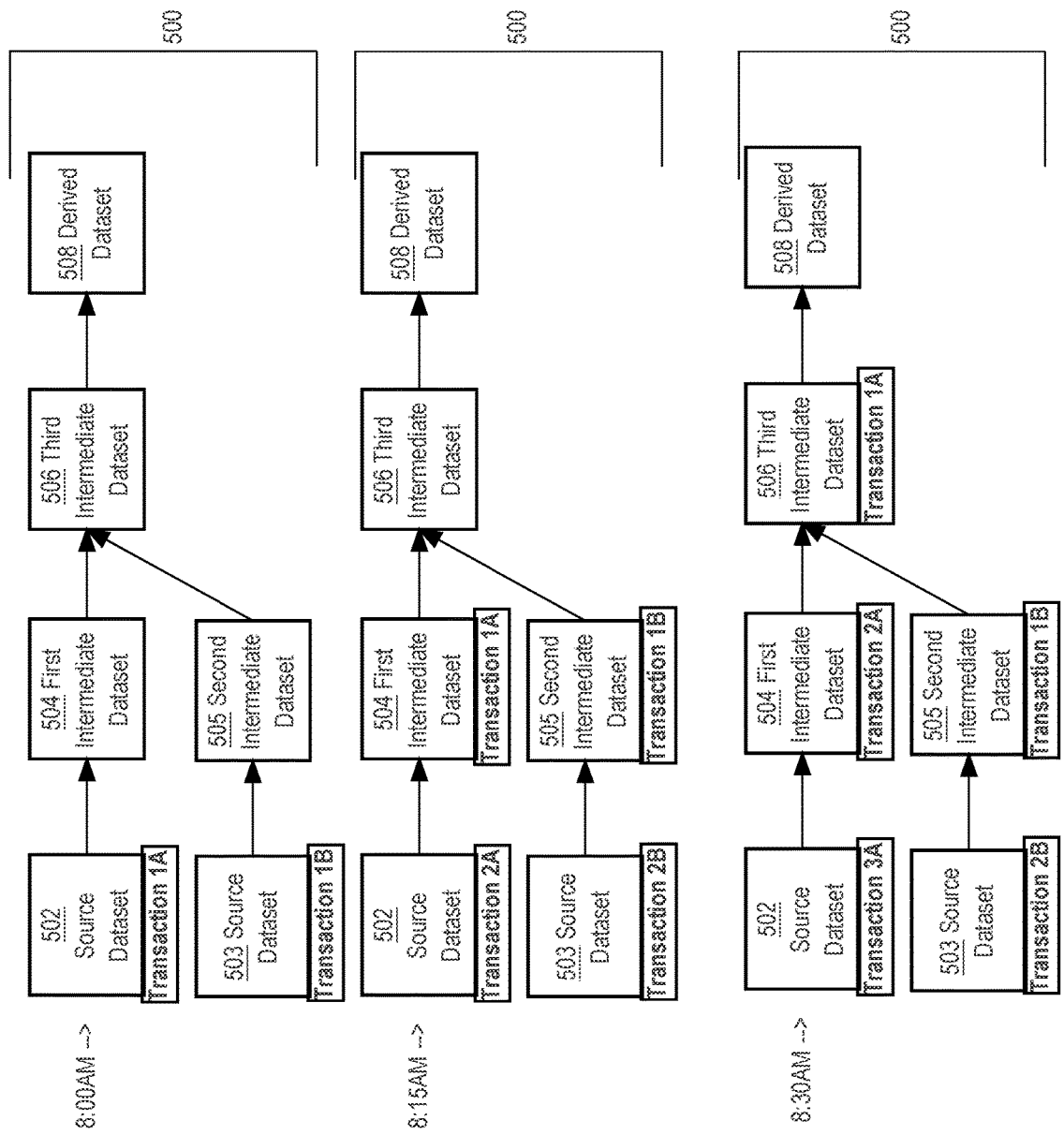

CONTINUOUS BUILDS 802

☑ Only My Schedules

| Dataset | Owner | Frequency (minutes) | |
|---|---|---|---|
| 822 Select dataset to add... 820 | | 824 Builds frequency (min) ◊ | 826 ⊕ |
| 806 dataset_A ❦ master 808 /User/admin/dataset_A | admin (admin admin) 810 | Builds at least every 360 minutes 812 | 814 ⊖ |
| dataset_B ❦ master /User/admin/dataset_B | admin (admin admin) | Builds at least every 60 minutes | ⊖ |
| dataset_C ❦ master /User/admin/dataset_C | admin (admin admin) | Builds at least every 30 minutes | ⊖ |

🔍 Search dataset 860

THROTTLED DATASETS 804

☑ Only My Schedules

| Dataset | Owner | Frequency (minutes) | |
|---|---|---|---|
| 850 Select dataset to add... 852 | | 854 Builds frequency (min) ◊ | 856 ⊕ |
| 836 dataset_B ❦ master 838 /User/admin/dataset_B | admin (admin admin) 840 | Builds at least every 30 minutes 842 | 844 ⊖ |

🔍 Search dataset

CONTINUOUS BUILDS OF DERIVED DATASETS IN RESPONSE TO OTHER DATASET UPDATES

BENEFIT CLAIM

This application claims the benefit under 35 U.S.C. § 120 as a Continuation of application Ser. No. 15/963,038, filed Apr. 25, 2018, which claims the benefit under 35 U.S. C. § 119(e) of provisional application 62/589,856, filed Nov. 22, 2017, the entire contents of which are hereby incorporated by reference for all purposes as if fully set forth herein. Applicant hereby rescinds any disclaimer of claim scope in the parent applications or the prosecution history thereof and advises the USPTO that the claims in this application may be broader than any claim in the parent applications

FIELD OF THE DISCLOSURE

The present disclosure is in the technical field of computer-implemented distributed database systems. Another technical field is computer-implemented processing of data dependency management. More specifically, the example embodiment(s) described below relate to computer-implemented techniques for automatically continuously initiating build jobs for derived datasets in data pipelines while satisfying data dependencies.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data analysis benefits from the definition of data production pipelines that specify source datasets as input, transformations, and derived datasets as output. Multiple sets of input datasets, transformations, and derived datasets may be arranged serially or in tree or graph structures to form complex data pipelines. Such a pipeline involves data dependencies, as opposed to software or program code dependencies. Raw datasets represent data drawn from data source, such as a file system, database, or other data source. A complex dataset may be built by a data processing job on one or more input datasets upon which the complex dataset is dependent on. Thus, a complex dataset may be built based on a combination of raw datasets or other complex datasets. Furthermore, the overall data pipeline system may use a graph in digital memory to represent dependencies of raw datasets and complex datasets; the graph consists of data representing nodes and relationships or links.

More specifically, distributed database systems are now available that implement data pipelines capable of executing serial or serial-parallel transformations on data tables. In an example pipeline, one or more raw datasets are used to build one or more derived datasets, according to one or more transformations. Source code development languages are available for expressing table schemas, transformations and other functional operations on rows or columns in the form of natural language code that can be transformed and committed in an executable form such as a SQL query.

Typically, processing of such pipelines to form a derived dataset (a "build") involves applying a particular update of a source dataset to intermediate derived datasets and the final derived dataset serially through transformations along the entire pipeline from start to finish. Furthermore, the dependency information needed to generate each intermediate derived dataset is retrieved only when that intermediate derived dataset is the subject of an intermediate derivation operation. Thus, traditional techniques for rebuilding complex datasets usually use a top-down approach. When a program or user requests building a derived dataset, the build tool walks a dependency list backwards to find all stale or unbuilt datasets on which the derived dataset depends, as far upstream as needed, then builds those datasets and all downstream dependent datasets while working back toward the end derived dataset. With this approach, if one of the already-build dependent datasets receives an update during the build process, the update will not propagate until another full build run is executed.

Thus, what is needed is a technique for dynamically building complex datasets as soon as possible, to increase the frequency at which derived datasets receive updates, as well as to improve system resource usage and efficiency.

SUMMARY

The appended claims may serve to summarize the disclosure.

BRIEF DESCRIPTION OF THE DRAWINGS

In the drawings:

FIG. 1 illustrates a distributed computing system with which embodiments may be implemented.

FIG. 3 illustrates an example of periodic progression of transactions in an example data pipeline consisting of a source dataset, intermediate datasets and a final derived dataset at successive different times.

FIG. 4 illustrates another example of periodic progression of transactions in an example data pipeline consisting of a source dataset, intermediate datasets and a final derived dataset at successive different times, using one embodiment.

FIG. 5A, FIG. 5B illustrate another example of periodic progression of transactions in an example data pipeline consisting of multiple source dataset, multiple intermediate datasets with dependency relationships and a final derived dataset, at successive different times, using another embodiment.

FIG. 8 illustrates an example screen display of a computer display device showing an example graphical user interface that may be used in one implementation.

DETAILED DESCRIPTION

Figure 2A:
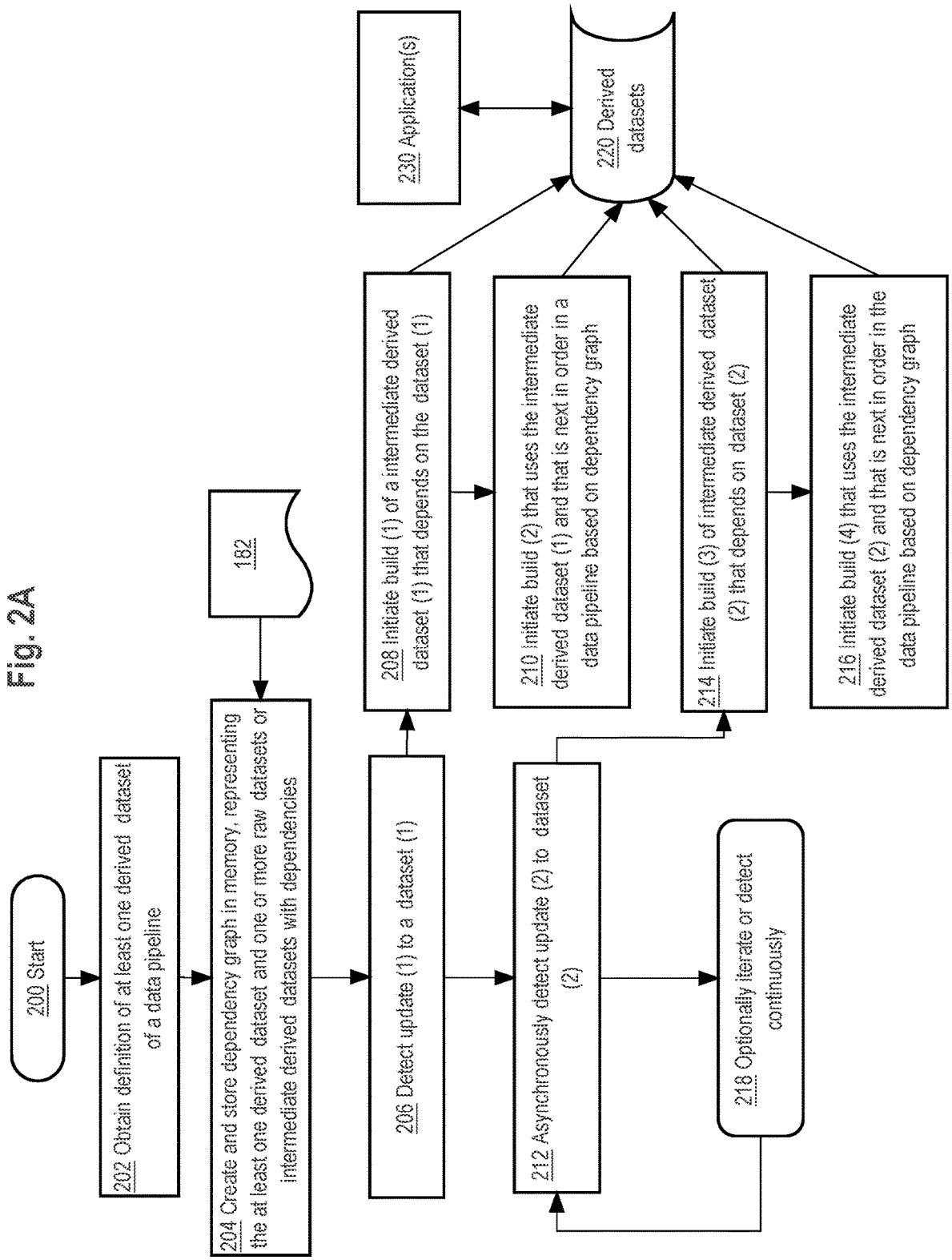
FIG. 2A illustrates an example algorithm or process of managing continuous build operations for derived datasets in data pipelines based upon dependency relationships and in response to arrival of transactions, in one embodiment.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

Embodiments are described in sections below according to the following outline:
General Overview
Distributed Database System Overview
Example Process of Automatically Managing Build Operations in Response to Arrival of Transactions With Satisfaction of Dependencies
Implementation Example—Hardware Overview
Implementation Example—Basic Software System
Extensions and Alternatives General Overview Techniques for efficient processing of datasets in a data pipeline system are described. The disclosure addresses data dependency management with the novel approach of creating and storing a dependency graph in advance of update processing, monitoring source datasets for changes, then propagating changes to other datasets as specified in a dependency graph without delay. Whenever an update is detected in a given dataset, the programmatic methods disclosed herein initiate a build of that dataset's downstream dependent datasets, regardless of whether builds are in process for other datasets in the dependency graph. In this manner, updates may be queued back-to-back in a data pipeline and multiple updates may flow through the pipeline at a particular time.

In one embodiment, these techniques can be implemented in a general-purpose data pipeline scheduler that can be applied to multiple complex pipeline processes that have shared dependencies or overlapping dependencies. Embodiments operate in part by digitally storing and managing a dependency graph that includes shared state information. Consequently, data pipelines that share datasets can reuse work and schedule around one another more intelligently.

Furthermore, in some embodiments, configurable options permit setting throttles on certain nodes in the dependency graph, so that users or programs can define desired update frequencies on particular datasets which are then propagated upstream in a pipeline to dependent datasets, thus minimizing unnecessary builds.

With these improvements, derived datasets receive important updates more continually and on a higher frequency than they would if traditional software dependency resolution approaches were applied.

In an embodiment, a data pipeline system may comprise a tree of raw datasets and derived datasets. Once a pipeline is defined, metadata representing upstream dependencies, comprising references to raw datasets or intermediate derived datasets, is retrieved and stored in memory as a directed acyclic graph. A reference to the graph is stored in association with the pipeline definition. A separate process continuously monitors each dataset that comprises a dependency of the final derived dataset defined in the pipeline. In response to detecting a transaction such as a change in a given dataset, the process starts building all downstream datasets that are derived from the changed dataset, regardless of whether other datasets in the dependency graph also are currently building. Updated derived datasets are queued into the build pipeline back-to-back.

Multiple updates may be in process concurrently and multiple updated derived datasets may be in queue as part of a pipeline at any given time. Throttle requirements and execution windows may be configured to de-prioritize builds of particular raw datasets or derived datasets that are subject to too-frequent updates or that require use of large resources to build.

In an embodiment, a data processing method comprises obtaining a definition of at least one derived dataset of a data pipeline, and in response to the obtaining: creating and storing a dependency graph in memory, the dependency graph representing the at least one derived dataset and one or more raw datasets or intermediate derived datasets on which the at least one derived dataset depends; detecting a first update to a first dataset from among the one or more raw datasets or intermediate derived datasets on which the at least one derived dataset depends, and in response to the first update: based on the dependency graph, initiating a first build of a first intermediate derived dataset that depends on the first dataset; initiating a second build that uses the first intermediate derived dataset and that is next in order in the data pipeline according to the dependency graph; asynchronously detecting a second update to a second dataset from among the one or more raw datasets or intermediate derived datasets on which the at least one derived dataset depends, and in response to the second update: based on the dependency graph, initiating a third build of a second intermediate derived dataset that depends on the second dataset; wherein the method is performed using one or more processors.

Other embodiments, aspects and features will become apparent from the disclosure as a whole including the following description, the drawings and the claims.

Distributed Database System Overview

FIG. 1 illustrates a distributed computing system with which embodiments may be implemented.

In an embodiment, a distributed computing system comprises a server computer ("server") 110 that is coupled via network 120 to a host computing device 130. The distributed computing system can be within one or more data centers, virtual computing facilities or other hosting facilities; other embodiments can be within a networked home, office, or campus. Further examples are described in other sections herein in connection with FIG. 6, FIG. 7.

Network 120 broadly represents a combination of one or more local area networks, wide area networks and internetworks and may include the public internet. The network 120 can connect one or more instances of the host 130 and server 110 together within the distributed computing environment. Network 120 can be composed of multiple sub-networks that are coupled. For example, the network 120 can be an Internet Protocol Version 4-based and/or an Internet Protocol Version 6-based wired or wireless network or a combination of multiple such networks.

Host computing device 130 broadly represents one or many computers and the number of hosts 130 in the system at a given time may vary in different embodiments and any number may be used. In an embodiment, a host 130 can be a single computing device such as computing device 600 that is described below with respect to FIG. 6. Alternatively, a host can be a single virtual computer instance that executes on a computing device facilitated by a virtualization layer (e.g., a Type 1 or Type 2 hypervisor) interposed between the virtual computer instance and the computing device. The virtualization layer can be a virtual machine monitor such as, for example, virtual machine monitor 730 described below with respect to FIG. 7.

Regardless if a single computing device or a single virtual computer instance is used, a host 130 can be configured with an operating system (e.g., UNIX, LINUX, MACOS, WIN- DOWS) as illustrated, for example, by operating system 710 described below with respect to FIG. 7. The operating system of a host 130 can manage low-level aspects of the host's operation including managing execution of processes, memory allocation, file input and output (I/O), and device I/O. Furthermore, the operating system of host 130 may manage presentation systems such as a windowed graphical user interface (GUI) and driving a computer display device such as a flat screen display or CRT. A host 130 may also be configured with a container system (e.g., the DOCKER container system) for running services within containers on the host's operating system.

Services that execute as processes on hosts in the distributed computing environment may be configured using the distributed configuration platform described herein or in application Ser. No. 15/284,959, filed Oct. 4, 2016, the entire contents of which is hereby incorporated by reference as if fully set forth herein.

In an embodiment, host 130 comprises an application instance 132 which allows one or more services to be deployed on host 130 from one or more server computing devices, such as server 110. In an embodiment, application instance 132 comprises a data analysis application 134, a front-end graphical interface 140 and a command-line interface (CLI) 142 that may interoperate to provide the functions that are described further herein. In some embodiments, the data analysis application 134 may be integrated into the distributed data storage system 180 or executed as a service or application on server 110 and coupled to the distributed data storage system, interacting with the application instance 132 using CLI 142, programmatic calls, remote procedure calls (RPC) or HTTP. In an embodiment, the front-end interface 140 and CLI 142 are programmed or configured to interact with one or more server-side functional units of server computer 110 as further described. In an embodiment, either the front-end interface or the CLI can be used to input program code in a source language, SQL queries, statements or transforms to SQL interface 150, in coordination with the data analysis application 134 using a text editor feature.

A service that data analysis application 134 facilitates or hosts can be a single instance of a software product or software application installed on at least one of the hosts 130. For example, a service might be a database server instance, a web server instance, or any other instance of a software product or a software application installed on one or more of the hosts 130. Multiple different services may be installed on the hosts 130 including multiple different services on the same host 130. For example, a service may be installed on multiple of the hosts 130 in a distributed, clustered, load balanced, or failover computing arrangement.

In an embodiment, server 110 comprises an SQL interface 150, a core resilient distributed dataset (RDD) processor 160, one or more worker processes 170, and a distributed data storage system 180 that stores, for example, datasets 190, 192, 194 as further described. The datasets 190, 192, 194 broadly represent raw datasets that are stored in, copied to, or otherwise received into the distributed data storage system 180, and derived datasets that are created under program control from one or more raw datasets as sources and using one or more transformations that specify how to transform the raw datasets to yield the derived datasets.

The transformations may comprise any operation that transforms columns or data of a first dataset to columns or data of a second, derived dataset. The first dataset may be a raw dataset or a derived dataset. The transformations may comprise, for example, creating the derived dataset without a column that is in the raw dataset, creating the derived dataset with a column that is in the raw dataset and using a different name of the column in the derived dataset, performing calculations that change data or add columns with different data, filtering, sorting or any other useful transformation. Performing such data transformations also results in transforming server 110 from a first state into a second, different state as represented by different data values in distributed data storage system 180.

Distributed data storage system 180 manages one or more dataset dependency graphs 182. "Graph," in this context, is used in the computer science sense referring to electronic digital data representing a tree or structure comprising a plurality of nodes representing data objects or things that are linked via edges representing relationships. Graphs may be directed, acyclic, formed as trees or use other structures. A "graph" in this context does not refer to a chart or diagram but comprises digitally stored data representing nodes and edges.

In one embodiment, graph 182 comprises stored data defining or describing both relationships of derived datasets to other related raw or derived datasets, including dependencies. Optionally, the graph may include timestamps of creation or updates to raw or derived datasets. Thus, for any derived dataset Dn having dependencies for example upon raw datasets R1 . . . Rn and upon derived datasets Dn+1 . . . Dm, the dataset dependency graph 182 may contain attributes or records identifying R1 . . . Rn and Dn+1 . . . Dm, effectively specifying a build graph of nodes and edges that specify datasets related to other datasets and their dependencies. In some embodiments, graph 182 further comprises timestamp values for each of R1 . . . Rn and Dn+1 . . . Dm that indicate the last time at which those datasets were created or updated. Therefore, programmed processes described further herein can access, at any time, a graph of relationships of one derived dataset to dependent or input datasets, as well as data indicating whether those dependent or input datasets have been recently updated.

A plurality of different data pipelines all may retrieve, inspect and use a shared dependency graph, in one embodiment. In this approach, shared state information in a globally applicable dependency graph permits multiple different data pipelines that share datasets to initiate builds of downstream datasets based upon inspecting data that indicates that other pipelines have completed necessary upstream updates. This permits different pipelines to reuse work and schedule around one another more intelligently.

The dataset dependency and timing metadata 182 also can be implemented using a stored combination of a tree data structure and a lookup table structure. In an embodiment, a stored graph or tree representing dependency information for a plurality of datasets comprising a plurality of nodes, each node of the tree corresponding to a dataset of the plurality of datasets. Further, in an embodiment, dataset dependency and timing metadata 182 comprises a stored lookup table having a plurality of entries that correspond to the plurality of datasets, each particular entry of the plurality of entries corresponding to a particular dataset of the plurality of datasets and comprising a first timestamp representing the time that particular dataset was last modified and a second timestamp representing the time that particular dataset was last used for data processing.

In various embodiments, relationship or graph data, and timestamp data, of the metadata 182 may be maintained in different data structures, tables or files of server 110 and/or distributed data storage system 180. For illustrating a clear example, FIG. 1 and other aspects of this disclosure treat dataset graph data and timestamp data as unified, but separation is possible in an embodiment. Or, an embodiment may maintain a data structure for each dependent dataset that specifies all its input raw datasets and a timestamp of their last update. Further, an embodiment of the process of FIG. 2A as further discussed may obtain dependency data or dataset graph data by querying or calling a system function or library of the distributed data storage system 180.

As described further in other sections, datasets 190, 192, 194 and any number of other datasets may be arranged in data transformation pipelines that link raw datasets to derived datasets, and derived datasets to other derived datasets, in relationships of arbitrary complexity to permit filtering, copying, transforming, adjusting access controls, and many other kinds of data operations. The three datasets 190, 192, 194 of FIG. 1 are shown merely to illustrate a clear example and other embodiments may have any number of datasets.

In an embodiment, SQL interface 150 is programmed or configured to receive electronic digital messages that define database operations according to a structured query language, parse the messages to determine the operations, and instruct the core RDD processor 160 to execute the operations. Typically, execution of the operations causes instructing one or more worker processes 170 to execute builds of derived datasets, based on raw datasets, with distributed data storage system 180. In one implementation, SQL interface 150 comprises an executable instance of SPARK SQL; the core RDD processor 160 is an executable instance of the SPARK Core; and distributed database system 180 may be an executable instance of a HADOOP file system or a hierarchical distributed database server that implements object immutability.

In an embodiment, the build operations are automatically initiated and/or scheduled at different times under the control of build management instructions 172, which may implement the algorithms and processes that are described further in other sections. Furthermore, build operations may be executed according to a job specification 174 that is generated by worker process 170 or received via configuration data from application instance 132 or other sources.

In general, SQL interface 150 provides a flexible and efficient way to indirectly specify rows in a database to be acted upon, with the security of not explicitly transmitting row identifiers across a network connection, but its use is optional and other ways of specifying or identifying rows could be used in other embodiments. For example, as an alternative to an SQL query, a set of explicit row identifiers may be cryptographically hashed using SHA-256 or another hash algorithm and the resulting hash strings may be transmitted in a request to the processor 160. The processor 160 then may command worker process 170 to compare the hash string values to an index of previously prepared hash string values of rows of datasets in the distributed data storage system 180, and then delete rows where a hash match is found. Both the SQL approach and hash approach have the benefit of avoiding transmission of an explicit row identifier, which could be recorded in a log file or otherwise stored in an unanticipated manner.

In an embodiment, each of the data analysis application 134, SQL interface 150, core RDD processor 160, worker process 170, build scheduling instructions 172 and distributed data storage system 180 comprises a set of one or more pages of main memory, such as RAM, in the host computer 130 or server 110 into which executable instructions have been loaded and which when executed cause each respective computer to perform the functions or operations that are described herein with reference to those functional units. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture.

In another embodiment, each of the aforementioned instructions also may represent one or more files or projects of source code that are digitally stored in a mass storage device such as non-volatile RAM or disk storage, in the server 110 or a separate repository system, which when compiled or interpreted cause generating executable instructions which when executed cause the server 110 to perform the functions or operations that are described herein with reference to those modules. The specific manner in which programmers or software developers organize and arrange source code for later compilation into an executable, or interpretation into bytecode or the equivalent, for execution by the server 110 or host computing device 130, is not critical.

Figure 2B:
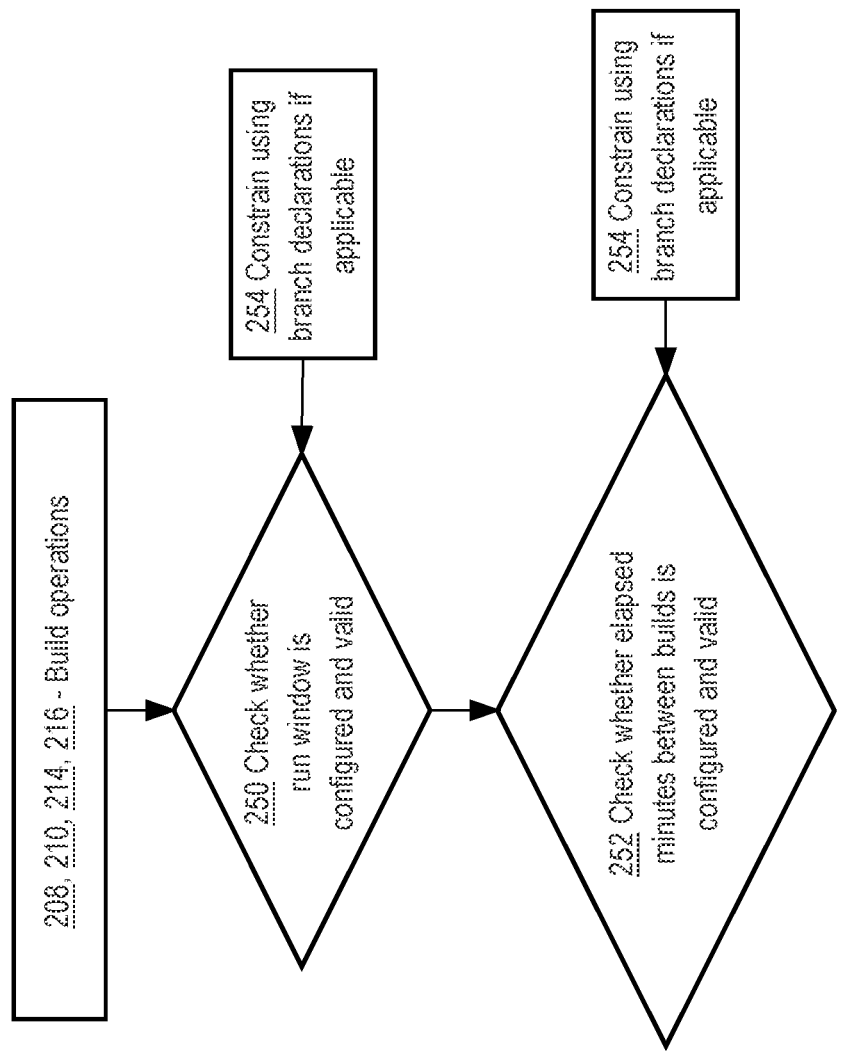
FIG. 2B illustrates an example algorithm or process of managing build operations based on certain operational constraints, in one embodiment.

Example Process of Automatically Managing Continuous Build Operations in Response to Arrival of Transactions with Satisfaction of Dependencies FIG. 2A illustrates an example algorithm or process of managing continuous build operations for derived datasets in data pipelines based upon dependency relationships and in response to arrival of transactions, in one embodiment. FIG. 2B illustrates an example algorithm or process of managing build operations based on certain operational constraints, in one embodiment. FIG. 2A and any other flow or process description in this disclosure is intended to represent an algorithm or plan for programming computer programs at the same level of detail that skilled persons in this field use to communicate among themselves about the architecture, process or data flow, arrangement, ordering and content of similar computer programs of similar types. That is, the flow diagrams and process descriptions are presented at a level of detail that skilled persons in this field have determined to be sufficient to communicate between themselves the baseline information that is adequate to permit the coding, completion, testing and deployment of computer programs that will execute and operate to provide the functions that are described herein.

Referring first to FIG. 2A, in one embodiment a computer-implemented processing flow begins execution at step 200 and at step 202 the flow obtains a definition of at least one derived dataset of a data pipeline. In various embodiments, step 202 may comprise using configuration data or a configuration file to define, identify, mark or flag one or more particular named datasets as subject to continuous build processing in the manner further described herein for the remainder of FIG. 2A. For example, build management instructions 172 or a configuration file associated with distributed data storage system 180 may comprise a list of datasets that are subject to build processing as described herein. Or, step 202 may involve using a programmed implementation of FIG. 2A to programmatically call a list of datasets and load metadata describing those datasets for processing according to FIG. 2A. The particular technique that is used to implement step 202 is not critical and what is important is to obtain some indication of a dataset that should be processed using continuous build operations. FIG. 8, which is described in more detail in another section, illustrates an example of a graphical user interface that may be programmed to support configuring dataset builds according to these techniques.

At step 204, the flow creates and stores a dependency graph in memory. The dependency graph represents the derived dataset that was identified at step 202, as well as all its dependencies in the form of one or more raw datasets or intermediate derived datasets and their dependencies. Step 204 may involve, in various embodiments, retrieving or copying a snapshot of an existing, previously created and stored dependency graph, or creating and storing a dependency graph for all or a part of a pipeline in the first place. In one implementation, the dependency graph comprises programmatic objects stored in memory as nodes representing datasets, and each of the nodes comprises one or more edge attributes representing edges that connect the nodes to other nodes. In another implementation, dependency graph data may be stored in a native graph-oriented database such as NEO4J.

At step 206, the flow detects a first update to a first dataset from among the source or intermediate datasets in the dependency graph for the derived dataset that was identified at step 202. Updates may be detected programmatically, for example using calls of build management instructions 172 (FIG. 1) according to an API that is implemented at distributed data storage system 180 for reporting changes to datasets 190, 192, 194. Or, the distributed data storage system 180 may be programmed to send push notifications to build management instructions 172 when a dataset 190, 192, 194 is updated. The particular programmatic or communications mechanism that is used to inform the flow or the build management instructions 172 that an update occurred is not critical. Updates may be implemented in a transaction-based system that implements locking or other controls on the use of datasets during updates.

At step 208, in response to detecting an update at step 206, the flow initiates a first build of an intermediate dataset that depends on the first dataset that was the subject of the update or transaction. Creation of a derived dataset 220 may result. Furthermore, at step 210 the process initiates a second build that uses the first intermediate derived dataset and that is next in order in a data pipeline based on the dependency graph. Steps 208, 210 initiate builds without waiting for an update to propagate completely through the data pipeline that is described in the dependency graph. Instead, a build that can be completed, is completed, subject to waiting on any upstream dependencies. These principles are described graphically and in more written detail in subsequent sections of this disclosure.

At step 212, asynchronously with respect to steps 206, 208, 210, the flow detects a second update to a second dataset. In response, at step 214, the flow initiates a third build of a second intermediate derived dataset that depends on the second dataset. Furthermore, at step 216 the flow initiates a fourth build that uses the second intermediate derived dataset and that is next in order in the data pipeline based on the dependency graph.

"Asynchronously," in this context, indicates that the flow of FIG. 2A can detect and respond to updates to different datasets arriving at arbitrary times with respect to one another, and in any order. As updates are detected, the dependency graph is detected to determine if an updated dataset is a dependency for a downstream derived dataset. If so, and the downstream derived dataset is not dependent upon another update that has been detected and is not yet complete, then a build of that downstream derived dataset can be initiated without delay. Furthermore, derived datasets 220 ultimately created from these processes are available to applications 230 without delay.

As shown in step 218, the process of FIG. 2A may iterate, loop or otherwise perform continuous detection of updates to arbitrary datasets on an ongoing basis. In some embodiments, interrupts, tests or breaks may be built into the flow, but it also may be implemented as a continuously executing process or daemon.

Referring now to FIG. 2B, the algorithm or process of FIG. 2A may be executed subject to certain operational constraints, in various embodiments. As seen in FIG. 2B, each of the build operations of step 208, 210, 214, 216 may involve processing one or more tests or constraints. These tests or constraints permit adapting the execution of the flow of FIG. 2A for updates to some datasets that may be less important or time-sensitive than others.

In one embodiment, at step 250, the flow provides for checking whether a run window is valid. In such an embodiment, a build operation is initiated only during a specified run window of time. For example, build operations might be scheduled to execute only between midnight and 6:00 AM, or only within a certain hour, group of hours or other period. The test or constraint of step 250 is useful in situations in which a particular build is known to require significant time to complete; in that case, it could be impractical or undesirable to initiate the build at particular times when applications are likely to need the data in the derived dataset. Instead, it may be beneficial to defer the execution of builds until a low-demand time. In an embodiment, the run window may be represented in a configuration file, other configuration data, a database, or hard-coded. For example, a configuration file may specify or declare run window configuration data using a starting time value and a duration value, which are declared in association with a dataset name. crontab formatting may be used for the starting time value and the duration value may be in minutes, as in this example:
  pipelines:
    name: datasystem.softname
    run_windows:
      ["0 1 * * * *", 60]
      ["0 5 * * * *", 30]
    min_minutes_between_builds: 60
which would allow the datasystem.softname dataset to be run in the time periods of 1:00 AM to 2:00 AM, and 5:00 AM to 5:30 AM.

Different specifications of run windows for this purpose may be associated with different datasets as attributes of configuration declarations or objects.

In another embodiment, step 252 specifies to check whether a specified number of minutes has elapsed between successive builds. The test or constraint of step 252 is useful in situations in which a particular dataset receives multiple updates within a short time period; in that case, it would be inefficient to repeatedly initiate multiple build operations to account for each of the updates. Instead, it may be beneficial to effectively throttle the execution of builds and only perform derivation of downstream datasets after several updates to a dependent dataset have been received or performed.

In an embodiment, the specified number of minutes may be represented by declaring elapsed time configuration data in a configuration file, other configuration data, a database, or hard-coded. The elapsed time configuration data may specify a period, for example a numeric value representing minutes, in association with a dataset name or pipeline name. Different specifications of periods or time values for this purpose may be associated with different datasets as attributes of configuration declarations or objects. Each value specifies a minimum amount of time that must pass after a dataset's last committed transaction before it is allowed to be built again. This can be used as a throttling mechanism for datasets whose source data is updated frequently, but do not need to build quite as often. In an embodiment, specifying the minimum minutes value on pipelines recursively propagates to parent datasets; on datasets with multiple children, the minimum value may be used. The value is optional, and if omitted, allows datasets to build as soon as an update to source data is detected.

For example, assume that intermediate dataset B is costly to compute, requiring 30 minutes of CPU time, but contains non-critical updates. However, building B blocks a build of intermediate dataset AB, and thus blocks updates from Source A from quickly reaching an ultimate derived dataset AB'. In an embodiment, a throttle signal may be set on intermediate dataset B that instructs the flow to build that dataset only once every 24 hours. Therefore, after intermediate dataset B is built once, updates from Source A can flow through the pipeline more quickly. FIG. 8, which is described in more detail in another section, illustrates an example of a graphical user interface that may be programmed to support configuring a dataset to execute using a throttled schedule.

As seen at step 254, either the run window constraint of step 250 or the throttle constraint of step 252 may be further constrained using one or more branch declarations. In one embodiment, a pipeline may be associated with a particular logical branch of a system from among a plurality of branches. An example may be a master branch and a development branch, in which revisions are made and tested with the development branch before being propagated or copied to the master branch for production use. In these situations, configuration data or a configuration file may associate a run window constraint or a throttle constraint with a particular branch of a pipeline using a declarative parameter. The processes of FIG. 2A, FIG. 2B may be programmed to read and interpret a branch declaration and to perform the tests of steps 250, 252 only for updates that are detected in relation to datasets that are associated with pipelines of the specified branch. Therefore, a branch declaration can assist a user or computer in limiting the effect of steps 250, 252 to a development branch of a system or other branch based on the goals or needs of the user or system.

In one embodiment, the configuration data, files or declarations that implement the run window constraint of step 250 or the throttling constraint of step 252 may be specified for individual upstream datasets. In such an embodiment, the individual constraints on a particular upstream dataset may be propagated automatically upstream to other datasets earlier in order; this is practical because with a constraint set on a midstream dataset, there is no reason for datasets that are further upstream to undertake build operations. In another embodiment, the configuration data, files or declarations that implement the run window constraint of step 250 or the throttling constraint of step 252 may be specified for a final derived dataset, and with that configuration, the constraints of steps 250, 252 effectively govern an entire pipeline.

In some embodiments, implementations of steps 250, 252 may comprise:

reading run window configuration data associated with the first dataset and specifying one or more periods; in response to the first update, initiating the first build of the first intermediate derived dataset that depends on the first dataset only when a then-current time is within one of the one or more periods specified in the run window configuration data.

reading run window configuration data associated with the at least one derived dataset and specifying one or more periods; in response to the first update, initiating the first build of the first intermediate derived dataset that depends on the first dataset only when a then-current time is within one of the one or more periods specified in the run window configuration data.

in response to the second update, initiating the third build of a second intermediate derived dataset that depends on the second dataset only when a then-current time is within one of the one or more periods specified in the run window configuration data.

for situations where building the second dataset is dependent upon availability of the first dataset in an updated state, and further comprising: reading run window configuration data associated with the second dataset and specifying one or more periods; in response to the first update, initiating the first build of the first intermediate derived dataset that depends on the first dataset only when a then-current time is within one of the one or more periods specified in the run window configuration data associated with the second dataset.

reading elapsed time configuration data associated with the first dataset and specifying a period; in response to the first update, initiating the first build of the first intermediate derived dataset that depends on the first dataset only when a previous build of the same dataset occurred earlier than a then-current time less the period specified in the elapsed time configuration data.

reading elapsed time configuration data associated with the at least one derived dataset and specifying a period; in response to the first update, initiating the first build of the first intermediate derived dataset that depends on the first dataset only when a previous build of the same first intermediate derived dataset occurred earlier than a then-current time less the period specified in the elapsed time configuration data.

in response to the second update, initiating the third build of a second intermediate derived dataset that depends on the second dataset only when a previous build of the same second intermediate derived dataset occurred earlier than a then-current time less the period specified in the elapsed time configuration data.

for situations where building the second dataset is dependent upon availability of the first dataset in an updated state, and further comprising: reading elapsed time configuration data associated with the second dataset and specifying a period; in response to the first update, initiating the first build of the first intermediate derived dataset that depends on the first dataset only when a previous build of the same first intermediate derived dataset occurred earlier than a then-current time less the period specified in the elapsed time configuration data.

FIG. 3 illustrates an example of periodic progression of transactions in an example data pipeline consisting of a source dataset, intermediate datasets and a final derived dataset at successive different times. FIG. 3 is schematic in nature and the elements illustrated in FIG. 3 may be implemented, in practical embodiments, using stored digital data and programs that are configured to execute the functions that are next described. During all such execution, the programs result in transforming the state of a computer that is executing the programs from one state to a different state.

In the example of FIG. 3, a source dataset 302 is linked by a dependency relationship, indicated by an arrow, to first intermediate dataset 304, which is linked to second intermediate dataset 306, which is linked to third intermediate dataset 308, which is linked to derived dataset 310. Datasets 302, 304, 306, 308, 310 form a pipeline in which an update, to a first dataset, causes building the next dataset in the pipeline in a transformed state. Furthermore, the relationship of datasets 302, 304, 306, 308, 310 may be represented using a graph data structure in which nodes representing the datasets are linked by edges representing the relationships. A graph for datasets 302, 304, 306, 308, 310 is linear and is provided as an initial clear example, but other datasets may have relationships of arbitrary complexity resulting in dependency graphs of arbitrary complexity.

FIG. 3 also illustrates example states of datasets 302, 304, 306, 308, 310 at six (6) successive different times as indicated by time labels 9:00 AM, 9:15 AM, 9:30 AM, 9:45 AM, 10:00 AM, 10:15 AM. These times are hypothetical and provided solely to illustrate a clear example; in practical embodiments, processing times may be arbitrary and no limitation is intended by the specific labels used in FIG. 3. Assume that at 9:00 AM, source dataset 302 is the subject of updates in Transaction A as indicated by the first row of FIG. 3. After dataset 302 is updated, at 9:15 AM a build of dataset 304 commences to perform the updates of Transaction A, as shown in the second row of FIG. 3. Assume next that at 9:30 AM, as seen in the third row of FIG. 3, Transaction B is received and meanwhile a build of the second intermediate dataset 306 for Transaction A has initiated. In one approach that does not use the techniques described herein, the updates of Transaction B cannot be processed at dataset 302, because Transaction A has not propagated to derived dataset 310 at the end of the entire pipeline. Instead, Transaction B cannot be processed until the next full build of the entire pipeline, and the build of dataset 306 completes. Similarly, 9:45 AM, Transaction A is the subject of a build of third intermediate dataset 308, while Transaction C arrives; that transaction also is deferred. By 10:00 AM, the updates of Transaction A are in a build of derived dataset 310 at the end of the pipeline. Therefore, at 10:15 AM Transaction D can complete a build of dataset 302 and can advance to a build of dataset 304 along the pipeline.

However, in this approach, the updates of Transactions B and C have been lost. This disadvantage accrues from the presumption of programs operating according to FIG. 3 that it is necessary to wait for all updates to propagate to all datasets in a data pipeline, essentially to ensure that the last derived dataset in the pipeline has received all applicable updates. The inventors have discovered, in an inventive moment, that this approach is unnecessary if a dependency graph of the complete data pipeline can be created and stored separately, then inspected whenever an update is detected or whenever an upstream build is needed and used to determine programmatically whether a build can start without delay.

FIG. 4 illustrates another example of periodic progression of transactions in an example data pipeline consisting of a source dataset, intermediate datasets and a final derived dataset at successive different times, using one embodiment. The nature of datasets 402, 404, 406, 408, 410 for a pipeline 400, the associated dependency graph and processing times, are the same as specified for FIG. 3.

According to an embodiment, at 9:00 AM, Transaction A is received and a first build is initiated of source dataset 402 using the updates of Transaction A, as seen in the first row of FIG. 4. At 9:15 AM, as seen in the second row of FIG. 4, a second build of the first intermediate dataset 404 initiates, also using the updates of Transaction A. At about the same time, updates of Transaction B are detected in relation to source dataset 402.

In response, according to an embodiment, the dependency graph for the pipeline 400 is inspected based on traversing or walking the graph. The flow of FIG. 2A is programmed to detect that source dataset 402 does not have dependencies. Therefore, a build of source dataset 402 for Transaction B is initiated without delay, that is, without waiting for Transaction A to propagate to the end of the data pipeline.

Similarly, at 9:30 AM, the build of dataset 404 for Transaction A has completed and Transaction A is the subject of a new build of dataset 406. The build of source dataset 302 for Transaction B is complete and Transaction B is applied to first intermediate dataset 404. At about the same time, Transaction C is detected in relation to source dataset 402. As with the second row of FIG. 4, a build of dataset 402 for Transaction C is initiated without delay and a build of dataset 404 for Transaction B also is initiated without delay. Each such build can initiate because the subject datasets do not have incomplete upstream dependencies.

Figure 5B:
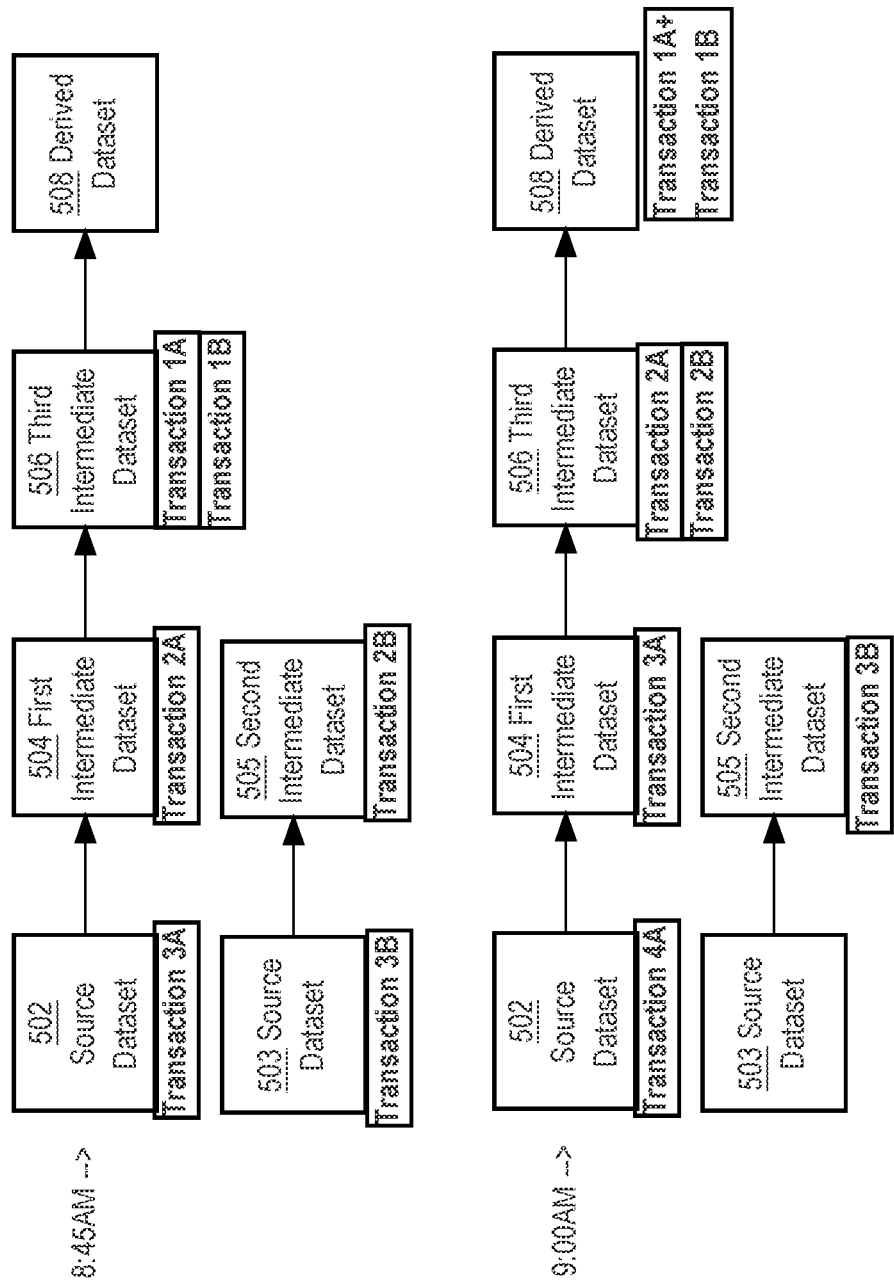

FIG. 5A, FIG. 5B illustrate another example of periodic progression of transactions in an example data pipeline consisting of multiple source datasets and multiple intermediate datasets with dependency relationships and a final derived dataset, at successive different times, using another embodiment. In the examples of FIG. 5A, FIG. 5B, a data pipeline 500 comprises datasets 502, 503, 504, 505, 506, 508. Third intermediate dataset 506 is dependent on both first intermediate dataset 504 and second intermediate dataset 505. All other dependencies are linear.

Referring first to FIG. 5A, at 8:00 AM, Transaction 1A is applied to source dataset 502 in a first build operation and Transaction 1B is applied to another source dataset 503 in a second build operation.

At 8:15 AM, those builds are complete and Transactions 1A, 1B are applied to first intermediate dataset 504 and second intermediate dataset 505 in third and fourth build operations, respectively. At about the same time, Transaction 2A is detected in relation to source dataset 502 and Transaction 2B is detected in relation to source dataset 503. These builds initiate.

Assume that the various builds take different times. Therefore, at 8:30 AM, the build of first intermediate dataset 504 is complete so Transaction 1A is ready to apply in a build operation at third intermediate dataset 506. Furthermore, Transaction 2A can apply to first intermediate dataset 504, since the build with Transaction 1A completed. However, the build of Transaction 1B is still in process at second intermediate dataset 505 and therefore Transaction 1B is not available to third intermediate dataset 506. Transaction 2B does not advance in the data pipeline 500 as it is not yet possible to build second intermediate dataset with Transaction 2B. Meanwhile, Transaction 3A is detected in relation to source dataset 502.

Referring now to FIG. 5B, by 8:45 AM, Transaction 1B has completed. At third intermediate dataset 506, both datasets 504, 505 on which it depends have been updated via Transactions 1A, 1B and therefore a build can be initiated without delay at dataset 506 for the updates of Transactions 1A, 1B. Furthermore, Transaction 2B may be applied to second intermediate dataset 505. The state of Transactions 2A, 3A is unchanged. Transaction 3B can arrive at source dataset 503, and a build of that dataset may initiate without delay.

At 9:00 AM, Transactions 1A, 1B have been built at the third intermediate dataset 506 and a build of derived dataset 508 may begin without delay for the updates of Transactions 1A, 1B. Further, a build of third intermediate dataset 506 is initiated without delay for the updates of Transactions 2A, 2B, which have completed at the datasets 504, 505 on which dataset 506 depends. Transaction 4A may arrive in relation to source dataset 502 and a build for that dataset can initiate without delay.

The foregoing descriptions of FIG. 3, FIG. 4, FIG. 5A, FIG. 5B generally have shown transactions or updates arriving first at a source dataset and proceeding relatively linearly from left to right in the drawing figures, that is, in the order of the data pipelines. However, the techniques disclosed herein can be used for updates that arrive at any dataset, source or intermediate, at any logical position in a data pipeline or dependency graph. The arrival of such an update causes the same programmatic behavior as described for FIG. 2A, FIG. 2B, namely inspection of a digitally stored dependency graph to determine whether the update can be built without delay, or whether other dependencies exist so that other updates should be awaited.

Furthermore, while clear examples of particular scope have been described, the techniques described herein may be implemented in connection with dependency graphs and pipelines of arbitrary complexity, including sharing of datasets among a plurality of different pipelines.

These examples illustrate that the method of FIG. 2A is effective to solve the problems that have been outlined in the Background and the approach illustrated in FIG. 3A and otherwise described herein. The processing of complex data transformation pipelines is made considerably more efficient by initiating a build of a derived dataset in response to determining that all dependencies of the derived dataset, in terms of raw datasets or other derived datasets, have been satisfied, based upon inspection of a digitally stored dependency graph. Rather than waiting until the last of all raw datasets has arrived asynchronously, and then attempting to build all needed derived datasets, the process automatically inspects a digital representation of a graph of the data pipeline, determines that a particular dataset has received all transactions or updates on which it depends, and initiates a build of each intermediate or derived dataset when all its dependencies are satisfied.

Consequently, each individual build consumes far less memory, storage and CPU cycles than for a comprehensive build. Furthermore, fewer computers overall may be needed because the same computer or virtual machine can be reused for successive individual builds of derived datasets as updates or transactions are available and/or as dependencies are satisfied, rather than using a much larger amount of resources later to hold a queue of updates or perform a large number of accumulated builds at the same time. Furthermore, embodiments can use throttling, scheduling and other techniques to balance and optimize the use of computing resources in comparison to the frequency of updates or the 854 importance of datasets to applications. For example, in some embodiments, the approach herein can eliminate the need to perform extra builds of the same dataset within the same day, thereby building only when necessary and using computing resources in an optimal way.

FIG. 8 illustrates an example screen display of a computer display device showing an example graphical user interface that may be used in one implementation. In one embodiment, front-end GUI 140 (FIG. 1) is programmed to generate the display of FIG. 8 and to receive and process input and interaction with the display.

In an embodiment, a screen display 800 comprises a Continuous Builds region 802 and a Throttled Datasets region 804, which respectively display identifiers and configuration parameters relating to datasets that are subject to continuous builds and that have been throttled using one of the throttling processes that has been previously described.

In an embodiment, the Continuous Builds region 802 comprises zero or more rows 806, each row comprising a dataset identifier 808, an owner identifier 810, a frequency parameter 812, and an editing icon 814 which when selected may signal the system to delete the associated row.

In an embodiment, a first row 820 is programmed or configured to receive input for adding a row, and has a dataset selection widget 822, a frequency selection widget 824, and an editing icon 826. The dataset selection widget 822 is programmed to provide a dataset browsing dialog with which input can be provided to select a particular dataset for use in a build. In response to completing selection of a dataset using widget 822, an Owner value is updated in the row based upon retrieving an owner value for the selected dataset from stored metadata associated with the datasets. The frequency selection widget 824 is programmed to receive input specifying a build frequency in minutes and/or to receive input selecting UP or DOWN widgets to effect a selection of a frequency value. The editing icon 826 is programmed when selected to cause adding a row having the values specified using the dataset selection widget 822 and the frequency selection widget 824. Adding a row causes data analysis application 134 to signal SQL interface 150 (FIG. 1) to initiate a worker process 170 to cause building the specified dataset according to the specified schedule.

In an embodiment, the Throttled Datasets region 804 comprises zero or more rows 836, each row comprising a dataset identifier 838, an owner identifier 840, a frequency parameter 842, and an editing icon 844 which when selected may signal the system to delete the associated row.

In an embodiment, a first row 850 is programmed or configured to receive input for adding a row, and has a dataset selection widget 852, a frequency selection widget 854, and an editing icon 856. These widgets and the icon are programmed to function as specified above for dataset selection widget 822, frequency selection widget 824, and editing icon 826, in relation to a dataset to be throttled. Adding a row using the editing icon 826 in this case causes data analysis application 134 to build management instructions 172 to update scheduling data in the system to cause building the specified dataset according to the specified throttled schedule.

In an embodiment, each of the Continuous Builds region 802 and Throttled Datasets region 804 may be programmed with Search widgets 860 that are programmed to receive input and execute searches for datasets that have been identified in the system using the regions 802, 804 and display paramaters for those datasets.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
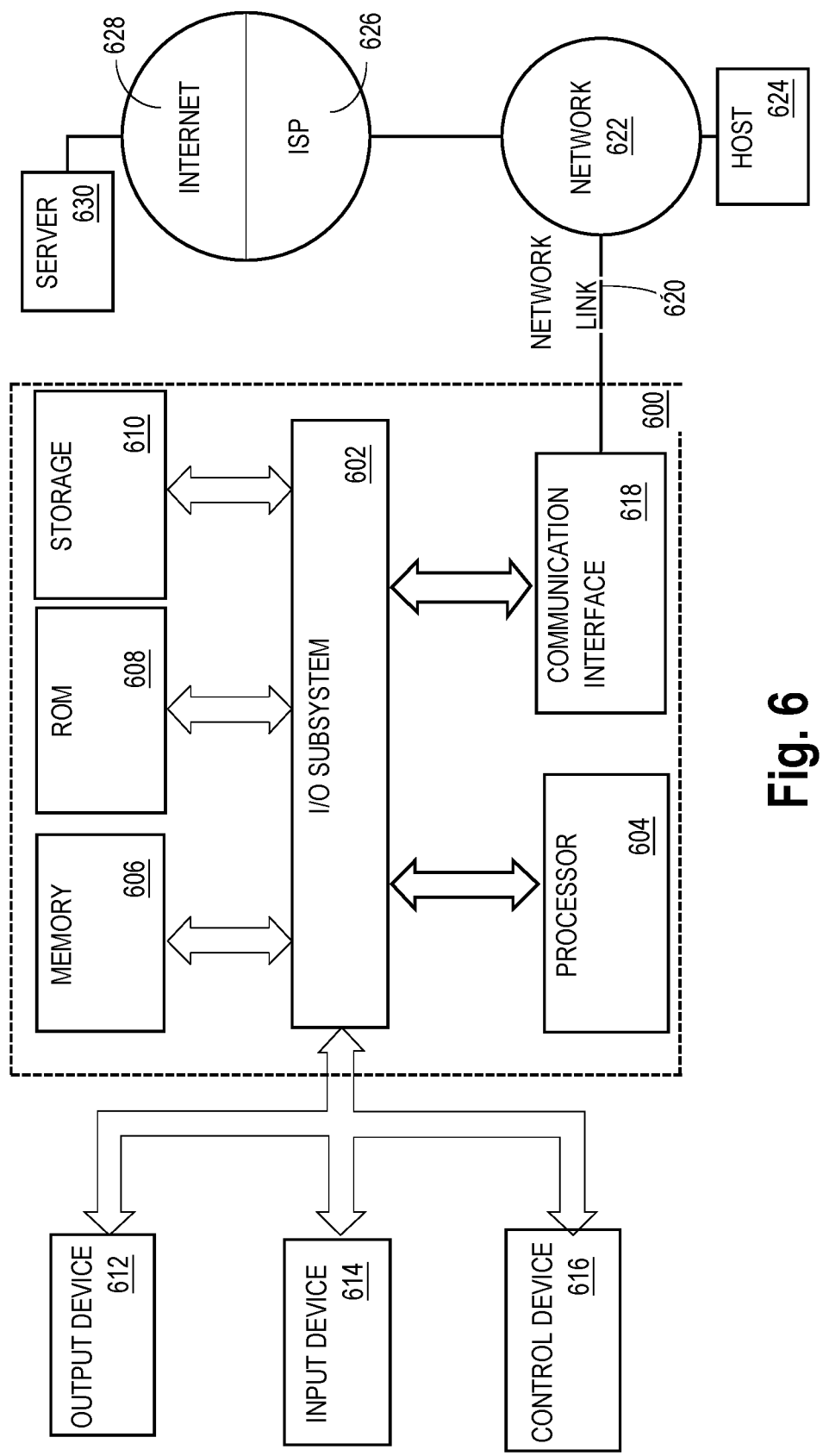
FIG. 6 is a block diagram that illustrates a computer system upon which an embodiment may be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

Implementation Example—Basic Software System

Figure 7:
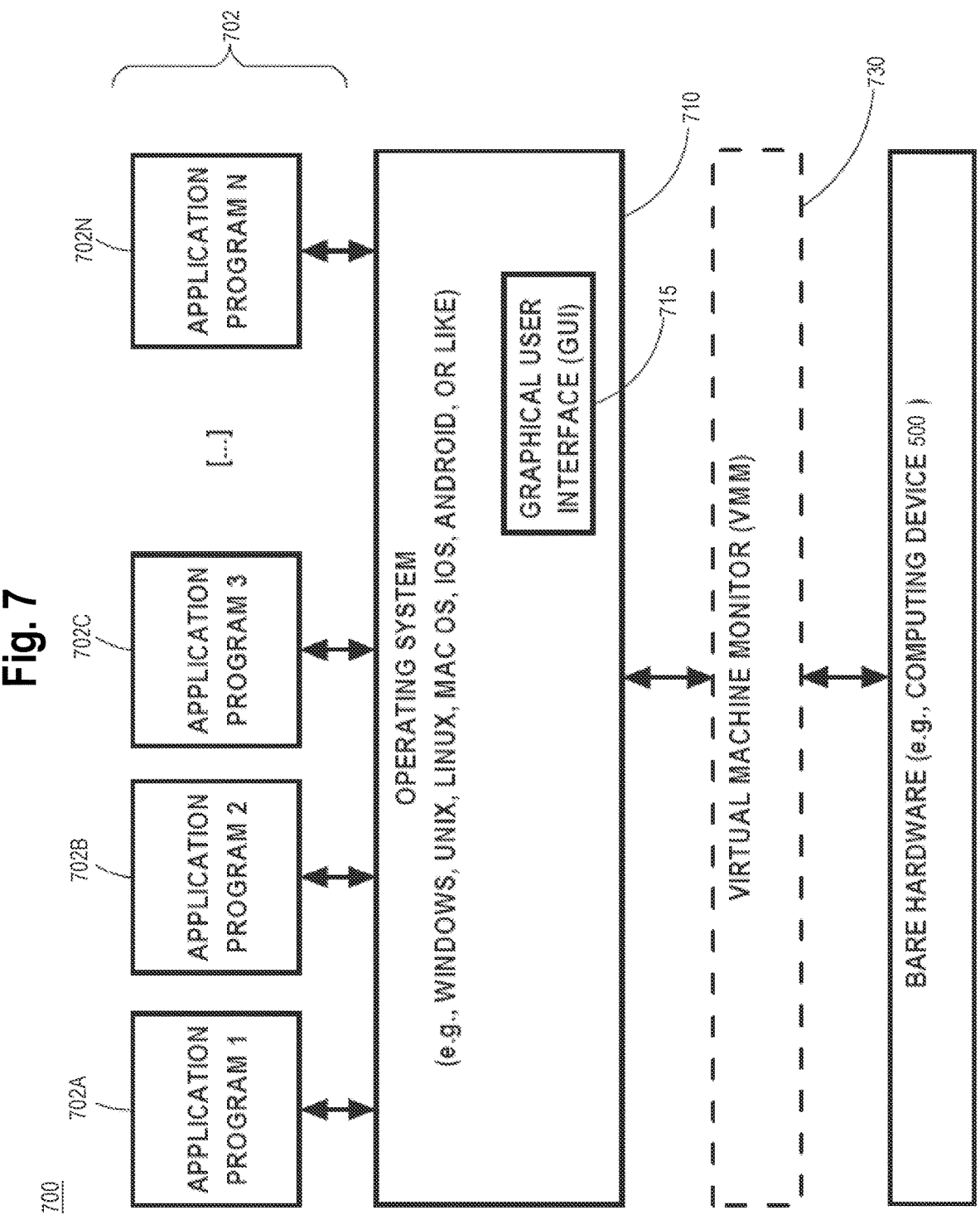
FIG. 7 is a block diagram of a basic software system that may be employed for controlling the operation of a computing device.

FIG. 7 is a block diagram of a basic software system 700 that may be employed for controlling the operation of computing device 400. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing device 400. Software system 700, which may be stored in system memory (RAM) 406 and on fixed storage (e.g., hard disk or flash memory) 410, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 410 into memory 406) for execution by the system 700. The applications or other software intended for use on device 700 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 404) of device 400. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the device 400.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of device 400 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
   creating and storing a dependency graph in memory, based on which a data pipeline is maintained,
   the dependency graph representing at least one derived dataset and one or more raw datasets or intermediate derived datasets on which the at least one derived dataset depends;
   reading configuration data specifying one or more periods for one or more datasets in the dependency graph;
   detecting, at an unscheduled time, a first update to a first dataset among the one or more raw datasets or intermediate derived datasets on which the at least one derived dataset depends;
   determining, in response to the first update, that a current time is within a first period of the one or more periods from a fixed time of a day or a previous build of a first intermediate derived dataset occurred earlier than the current time less a second period of the one or more periods;
   initiating, in response to the determining, at or near the current time, a first build of the first intermediate derived dataset that depends on the first dataset;
   detecting that a frequency of updates to a dataset on which the first intermediate derived dataset depends exceeds a threshold;
   in response to the detecting of the threshold being exceeded, updating the configuration data to revise the first period or the second period;
   asynchronously detecting a second update to a second dataset among the one or more raw datasets or intermediate derived datasets on which the at least one derived dataset depends;
   initiating, in response to the second update, a second build of a second intermediate derived dataset that depends on the second dataset without waiting for the first update to propagate through the dependency graph;
   detecting and initiating continuously as other updates to other datasets are received, wherein the method is performed using one or more processors.

2. The method of claim 1, the configuration data specifying the one or more periods respectively for one or more different datasets.

3. The method of claim 1, the first period or the second period being associated with the first intermediate derived dataset.

4. The method of claim 1, further comprising:
   updating the configuration data to specify a certain period for a pipeline that recursively applies to parent datasets;
   setting a period for a specific dataset having multiple children to a minimum of multiple periods applied to the multiple children.

5. The method of claim 1, further comprising:
   detecting that an amount of resource used in building the first intermediate derived dataset exceeds a second threshold;
   in response to the detecting, updating the configuration data to specify the first period or the second period.

6. The method of claim 1, the first period corresponding to an amount of resource usage below a certain threshold.

7. The method of claim 1, further comprising:
   detecting that a final dependency of a third intermediate derived dataset that depends on the first intermediate derived dataset is satisfied;
   initiating a third build of the third intermediate derived dataset.

8. The method of claim 1, the configuration data further specifying branch declarations related to logical branches of a build system.

9. The method of claim 8, further comprising determining that the first intermediate derived dataset is not associated with a logical branch of the logical branches for which the branch declarations are specified.

10. A computer-readable, non-transitory storage medium storing computer-executable instructions, which when executed implement a method, the method comprising:
    creating and storing a dependency graph in memory, based on which a data pipeline is maintained,
    the dependency graph representing at least one derived dataset and one or more raw datasets or intermediate derived datasets on which the at least one derived dataset depends;
    reading configuration data specifying one or more periods for one or more datasets in the dependency graph;
    detecting, at an unscheduled time, a first update to a first dataset among the one or more raw datasets or intermediate derived datasets on which the at least one derived dataset depends;
    determining, in response to the first update, that a current time is within a first period of the one or more periods from a fixed time of a day or a previous build of a first intermediate derived dataset occurred earlier than the current time less a second period of the one or more periods;
    initiating, in response to the determining, at or near the current time, a first build of the first intermediate derived dataset that depends on the first dataset;
    detecting that a frequency of updates to a dataset on which the first intermediate derived dataset depends exceeds a threshold;

in response to the detecting of the threshold being exceeded, updating the configuration data to revise the first period or the second period;

asynchronously detecting a second update to a second dataset among the one or more raw datasets or intermediate derived datasets on which the at least one derived dataset depends;

initiating, in response to the second update, a second build of a second intermediate derived dataset that depends on the second dataset without waiting for the first update to propagate through the dependency graph;

detecting and initiating continuously as other updates to other datasets are received, wherein the method is performed using one or more processors.

11. The computer-readable, non-transitory storage medium of claim 10, the configuration data specifying the one or more periods respectively for one or more different datasets.

12. The computer-readable, non-transitory storage medium of claim 10, the first period or the second period being associated with the first intermediate derived dataset.

13. The computer-readable, non-transitory storage medium of claim 10, the method further comprising:
updating the configuration data to specify a certain period for a pipeline that recursively applies to parent datasets;
setting a period for a specific dataset having multiple children to a minimum of multiple periods applied to the multiple children.

14. The computer-readable, non-transitory storage medium of claim 10, the method further comprising:
detecting that an amount of resource used in building the first intermediate derived dataset exceeds a second threshold;
in response to the detecting, updating the configuration data to specify the first period or the second period.

15. The computer-readable, non-transitory storage medium of claim 10, the first period corresponding to an amount of resource usage below a certain threshold.

16. The computer-readable, non-transitory storage medium of claim 10, the method further comprising:
detecting that a final dependency of a third intermediate derived dataset that depends on the first intermediate derived dataset is satisfied;
initiating a third build of second the third intermediate derived dataset.

17. The computer-readable, non-transitory storage medium of claim 10, the configuration data further specifying branch declarations related to logical branches of a build system.

18. The method of claim 8, further comprising determining that the first intermediate derived dataset is not associated with a logical branch of the logical branches for which the branch declarations are specified.

* * * * *

UNITED STATES PATENT AND TRADEMARK OFFICE
CERTIFICATE OF CORRECTION

Page 1 of 1

PATENT NO. : 12,229,189 B2
APPLICATION NO. : 17/826099
DATED : February 18, 2025
INVENTOR(S) : Daniel Deutsch et al.

It is certified that error appears in the above-identified patent and that said Letters Patent is hereby corrected as shown below:

In the Claims

Column 26, Line 17 In Claim 16, Line 6, delete "initiating a third build of second the third intermediate" and insert -- initiating a third build of the third intermediate --

Signed and Sealed this
Third Day of June, 2025

Coke Morgan Stewart
*Acting Director of the United States Patent and Trademark Office*